United States Patent

[11] 3,618,630

| | | |
|---|---|---|
| [72] | Inventor | Anthony E. Marcaccio<br>Los Angeles, Calif. |
| [21] | Appl. No. | 840,192 |
| [22] | Filed | July 9, 1969 |
| [45] | Patented | Nov. 9, 1971 |
| [73] | Assignee | Michael S. Louis<br>Studio City, Calif.<br>a part interest |

[54] PRESSURE VALVE INDICATOR
2 Claims, 4 Drawing Figs.

[52] U.S. Cl. .................................................. 137/227,
116/34, 137/557
[51] Int. Cl. ................................................... F16k 15/20
[50] Field of Search ........................................ 137/227;
73/146.8; 116/34; 152/429

[56] References Cited
UNITED STATES PATENTS

| | | | | |
|---|---|---|---|---|
| 2,948,256 | 8/1960 | Tapp | | 73/146.8 X |
| 3,230,968 | 1/1966 | Struby | | 137/227 |
| 3,451,418 | 6/1969 | Nakagawa | | 137/227 |

*Primary Examiner*—Harold W. Weakley
*Attorney*—Roger A. Marrs

ABSTRACT: The pressure valve indicator disclosed herein includes a hollow housing for slidably mounting a plunger having two positions, one position being substantially within the housing and the other position being substantially extended out of a selected end of the housing. Resilient biasing means within the housing normally urge the plunger into the housing to its substantially enclosed position while the biasing means is yieldable to applied pneumatic pressure above a predetermined amount to permit the plunger to axially move within the housing to its extended position. Stop means are provided for limiting the axial movement of the plunger to determine the two positions. Coupling means are carried on one end of the housing for detachably connecting with a conventional tire valve stem and a check valve or core is included in the plunger permitting introduction of air into the tire via an air passageway in the plunger, housing and valve stem.

PATENTED NOV 9 1971 3,618,630

ANTHONY E. MARCACCIO
INVENTOR.

BY Roger A. Marrs

3,618,630

PRESSURE VALVE INDICATOR

BACKGROUND OF THE INVENTION

1. Field of the Invention

This invention relates to pneumatic pressure indicators and, more particularly, to a novel pressure valve and indicator combination operable to sense and indicate reduced pressure in a pneumatic tire.

2. Description of the Prior Art

Modern vehicles such as automobiles, trucks, mobile homes, and the like, employ pneumatic tires for rollably supporting the vehicle on a street or roadway. Each of the pneumatic tires is rated for a predetermined air pressure selected to provide the most comfortable ride for occupants in the vehicle as well as maintaining structural integrity of the tire so as to provide long life and extended wear characteristics. In the event that the pressure falls below the predetermined rating or exceeds the rating, both the comfort and standards and tire wear characteristics are adversely affected.

Although previous attempts have been made to provide a pressure indicator for sensing and indicating pressure in a pneumatic tire, these attempts have not proven entirely successful because they require exact and detachment of the device to the conventional valve stem at the time pressure in the tire is being investigated. The use of such a device requires added work on behalf of service station attendants as well as vehicle owners, with the resultant tendency to avoid usage of the device. Other conventional devices are permanently attached to the valve stem of the pneumatic tire but are relatively complex and do not offer or provide visual indication of the tire pressure with respect to the predetermined specified or rated pressure level. Such devices generally include a scale so that the exact air pressure in the tire is noted; however, it has been found that indication of the exact pressure is generally not desired since only the reduced pressure indication is of most significant value.

SUMMARY OF THE INVENTION

Accordingly, the difficulties and problems encountered with conventional pneumatic valve indicators are obviated by the present invention which provides a novel indicator adapted to be detachably connected to an existing inflation valve stem on a pneumatic tire and which is responsive to loss of pneumatic pressure in the tire below its rated level. The indicator, in one form, includes an elongated hollow housing which slidably mounts a reciprocating plunger having an end portion thereof extending exteriorly of the housing. This latter portion or end of the plunger is enlarged so as to abut against the end of the housing to prevent the plunger from total enclosure by the housing. This latter means further provides a stop means engageable with the housing to indicate a first position of the plunger indicative of reduced pressure in the pneumatic tire. A resilient spring is enclosed by the housing and is compressibly disposed between a flange formed on the plunger and the end of the housing. The spring is specifically rated so as to be yieldable when the pneumatic tire pressure rating has been exceeded so that the plunger will advance substantially out of the housing to its second position indicative of adequate pneumatic pressure in the tire.

The plunger further includes a conventional check valve or core whereby air may be introduced to the tire through a continuous passageway formed in the plunger, housing and valve stem of the tire tube. Furthermore, means are provided for detachably connecting the housing to the conventional valve stem so that the device may be readily carried thereon during the use or operation of the vehicle.

When the plunger is in its first position, that is having its enlarged portion in abutment with the ends of the housing, a visual indication is presented indicative of reduced pressure in the tire.

Therefore, it is among the primary objects of the present invention to provide a novel pneumatic pressure indicator adapted to be carried on a conventional valve stem for indicating pneumatic tire pressure above or below a prescribed pressure level.

Another object of the present invention is to provide a novel pneumatic tire pressure indicator for sensing tire pressure and visually indicating reduced pressure in the tire.

Another object of the present invention is to provide a novel pressure valve and indicator adapted to be carried on a conventional pneumatic tire valve stem which is responsive to pneumatic pressure above or below a predetermined level and which includes a visual indication of the pressure condition within the tire.

Still a further object of the present invention is to provide a novel tire valve and pressure indicator permitting the flow of air into the tire and restricting air flow out of the tire and which includes visual means for indicating air pressure in the tire below a predetermined pressure level.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
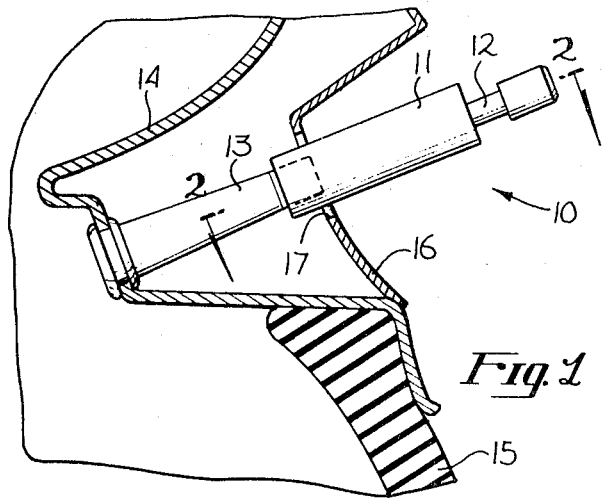
FIG. 1 is a side elevational view of the novel pressure valve and indicator incorporating the present invention and illustrated in use on a conventional inflation valve carried by a pneumatic tire and wheel assembly.
Figure 4:
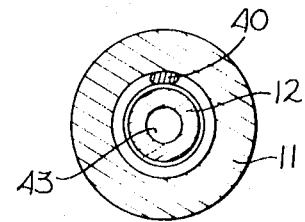
FIG. 4 is a transverse cross-sectional view of the pressure valve as taken in the direction of arrows 4—4 of FIG. 2.

Referring to FIG. 1, the novel valve and pressure indicator of the present invention is illustrated in the general direction of arrow 10 which includes a cylindrical housing 11 having a slidable plunger 12 movably carried thereon so as to axially move with respect to the housing to extend exteriorly thereof from a selected end. The opposite end of the housing is detachably connected to a conventional inflation valve 13 that is carried on a wheel rim 14 for mounting a conventional tire 15. Although a tubeless tire 15 is illustrated, it is to be understood that the present invention may be readily employed with inflation valves integrally formed with inner tubes as well. A wheel cover 16 is suitably attached to the rim 14 by any suitable means and includes an aperture 17 through which the inflation valve 13 and device 10 passes so as to be exposed exteriorly of the cover.

Figure 2:
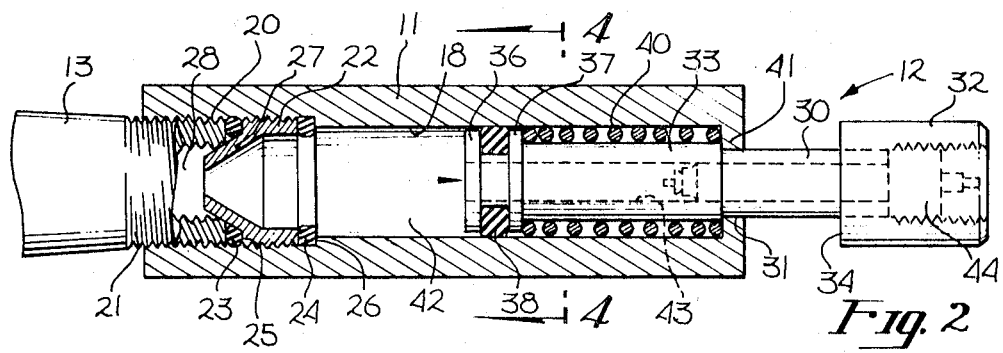
FIG. 2 is an enlarged cross-sectional view of the pressure valve shown in FIG. 1 as taken in the direction of arrows 2—2 thereof.

Referring now to FIG. 2, it can be seen that the housing 11 includes a bore 18 opening at one end with a plurality of threads 20 so as to be received in threadable engagement with a threaded end 21 of the inflation valve 13. The threadable connection of the housing with the inflation valve is suitably sealed to prevent passage of air between the joined parts by means of a plug element 22 threaded into the bore via threads 20 and sealed by means of elastomeric O-rings 23 and 24. Ring 23 is disposed between the extreme terminating end of the inflation valve and an annular shoulder 25 formed on the plug. O-ring 24 is sealingly disposed between the end of plug 22 and a shoulder 26 formed in the sidewall of the housing. The plug 22 includes a frustoconical portion 27 which extends from annular shoulder 25 into a central passageway 28 formed in the inflation valve 13. The plug element 22 is substantially hollow and is open-ended so as to be in fluid communication with bore 18 and passageway 28.

The plunger 12 includes an elongated shank slidable disposed through an opening 31 formed in a selected end 41 of the housing 11. The opening 31 is of substantially smaller diameter than the bore 18. The shank includes a first enlarged portion 32 formed on its exposed end exteriorly of the housing 11 and a second enlarged portion 33 integrally formed on the other end of the plunger enclosed by the housing so as to define a reduced diameter portion 30 of the plunger between the opposing faces 34 and 35 of the enlarged portions. Face 35 is arranged to abut against the end of the housing to prevent further extension of the plunger from the housing while face 34 will abut against the end of the housing to prevent the plunger from becoming totally enclosed within the housing.

Figure 3:
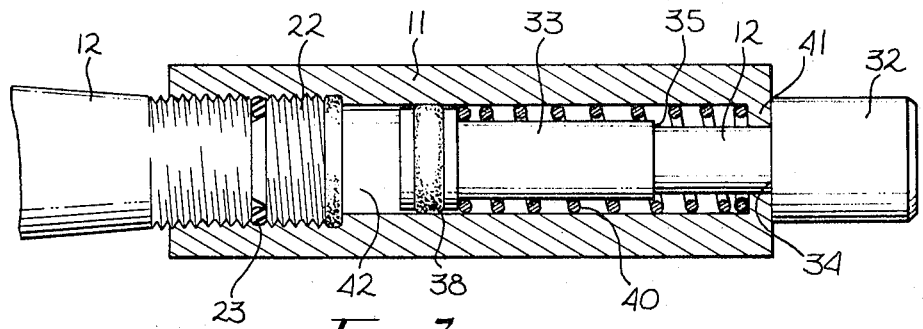
FIG. 3 is a view similar to the view of FIG. 2 showing the plunger of the valve seated against the end of the housing signifying reduced pneumatic pressure in the tire.

The extreme enclosed end of the plunger within the housing 11 includes a pair of spaced-apart annular flanges 36 and 37 which are separated by an elastomeric seal 38. Annular seal 38 bears against the wall of bore 18 so as to prevent passage therebetween. Resilient biasing means taking the form of a helical spring 40 is disposed within bore 18 of the housing and is compressed between annular flange 37 and the end of the housing as indicated by numeral 41. The expansion force of the spring 40 normally urges the plunger into the housing 11 so that the face 34 abuts against the end 41 of the housing. However, when sufficient pneumatic pressure is present within an air chamber 42 defined between plug element 22 and flange 36, the expanding force of the spring is overcome to slide the plunger into the position shown in FIG. 2 so that face 35 engages with end 41 of the housing. The expansive strength of the spring 40 is intentionally made critical so that compression of the spring occurs when the pressure level within chamber 42 exceeds a predetermined amount. The predetermined amount is selected as the desired pneumatic pressure level at which a particular tire is to be inflated. Therefore, should the pressure within chamber 42 be below the predetermined amount or level, the expansion force of spring 40 will forcibly urge the plunger to be retracted within the housing as shown in FIG. 3. When the pneumatic pressure within chamber 42 exceeds the predetermined level or amount, the spring 40 will be compressed and the plunger will be fully extended from the end of the housing as illustrated in FIG. 2.

The plunger 12 includes an open-ended passageway 43 which is in fluid communication with the air chamber 42. Disposed within passageway 43 is a conventional valve core 44 which is a one-way or check valve adapted to permit air to be introduced through passageway 43, chamber 42 and passageway 28 into the tube or tire 15 for inflation purposes. Details of the valve core are not illustrated inasmuch as valve cores are well known to those skilled in the art and are readily available for purchase as standard manufactured parts.

Referring now to FIG. 3, the plunger is illustrated in a position substantially enclosed by housing 11 whereby face 34 engages with end portion 41 of the housing. This condition is achieved because of the expanding force of spring 40 which is permitted to expand due to the reduction of air pressure in chamber 42.

In view of the foregoing, it can be seen that the novel pneumatic valve and pressure indicator of the present invention provides a simple and uncomplicated mechanism for sensing tire pressure and indicating whether the tire pressure is above or below its related level. In FIG. 2, the tire pressure is reflected in chamber 42 which impinges against annular flange 36 and the check valve 44 so as to forcibly slide the plunger 12 so that it is substantially extended beyond the end 41 of the housing 11. The extension of the plunger is readily visible to the eye of the driver, serviceman or occupant of the vehicle so that he has assurance that sufficient rated pressure is available in the tire. However, when a condition of reduced pressure is in the tire, such a reduction is reflected in chamber 42 and the expansive force of spring 40 forcibly urges the piston to slide into the chamber until face 34 strikes against end 41 of the housing. This position is shown in FIG. 3 and it is visually observable by the driver or station attendant. When the enlarged portion 32 is in abutment with the end 41 of the housing, this signifies that the reduced air pressure within the tire falls below the rated level or amount. Again, it is to be understood that the expansive force of spring 40 is predetermined to correspond with the pneumatic pressure rating of the tube or tire so that the expansive force of the spring will only bias or move the plunger into the housing when a reduction of pneumatic pressure in the tire below the rated amount is sensed.

If desired, the enlarged portion 32 may include eye-catching indicia or characters so as to be helpful in viewing at night or, the reduced shank portion 30 may be provided with a paint or plating color different than the color of the enlarged portion 32. Furthermore, it is to be understood that a pointer may be carried on the enlarged portion 42 facing the end 41 of the housing which would lend itself to a more convenient and easier visual indication of the extended plunger position shown in FIG. 2. Likewise, the reduced shank portion 30 may be include a graduated scale which is referenced against the edge of the housing end 41 to show approximate pneumatic pressure in units of pounds.

While particular embodiments of the present invention have been shown and described, it will be obvious to those skilled in the art that changes and modifications may be made without departing from this invention in its broader aspects, and, therefore, the aim in the appended claims is to to cover all such changes and modifications as fall within the true spirit and scope of this invention.

What is claimed is:

1. A pneumatic pressure valve and indicator device adapted to be detachable carried on an inflation valve stem of a tire or tube having a predetermined pneumatic pressure rating comprising:

a cylindrical housing having a central bore extending therethrough and opening at its opposite ends;

a plunger slidable carried in said housing bore and having a portion extending exteriorly of said housing, said plunger having a first position wherein said extended portion is substantially extended from a selected end of said housing and a second position wherein said extended portion is substantially enclosed by said housing;

resilient means carried in said housing bore operable to normally bias said plunger to its second position and being yieldable in response to pneumatic pressure in excess of said predetermined rating to advance said plunger to its first position;

stop means carried on said plunger and cooperating with an inwardly disposed circular flange on said housing selected end to arrest and limit movement of said plunger at said first and said second positions;

said stop means including a first enlarged portion carried on said plunger exteriorly of said housing and a second enlarged portion carried on the opposite end of said plunger from said first enlarged portion and said plunger having a reduced diameter portion between said first and said second enlarged portions so as to define a pair of spaced-apart and opposing faces for abutting with said circular flange carried by said selected end of said housing to restrict movement of said plunger;

said plunger including an open-ended central passageway and a check valve removably mounted in said plunger central passageway permitting the flow of air into said tire or to be for inflation;

sealing means disposed between said valve stem and said housing; and said last-mentioned sealing means including a stationary, nonmovable plug having a central opening threadably secured to said housing within said housing bore in spaced relationship to the end of said housing carried on said valve stem and a pair of O-rings disposed between said valve stem and said plug and between said plug and a circular shoulder formed in said housing bore.

2. The invention as defined in claim 1 wherein said resilient means comprises a helical expansion spring disposed about said plunger between said flanges and said housing selected end.

* * * * *